(12) United States Patent
Uchiyama et al.

(10) Patent No.: US 7,344,369 B2
(45) Date of Patent: Mar. 18, 2008

(54) CONTROLLER FOR INJECTION MOLDING MACHINE

(75) Inventors: Tatsuhiro Uchiyama, Gotenba (JP); Junpei Maruyama, Yamanashi (JP)

(73) Assignee: FANUC Ltd, Yamanashi (JP)

( * ) Notice: Subject to any disclaimer, the term of this patent is extended or adjusted under 35 U.S.C. 154(b) by 230 days.

(21) Appl. No.: 11/385,895

(22) Filed: Mar. 22, 2006

(65) Prior Publication Data

US 2006/0216370 A1    Sep. 28, 2006

(30) Foreign Application Priority Data

Mar. 28, 2005 (JP) ............................. 2005-092500

(51) Int. Cl.
*B29C 45/80* (2006.01)
(52) U.S. Cl. .................. 425/145; 425/149; 425/150
(58) Field of Classification Search ............ 425/145, 425/149, 150
See application file for complete search history.

(56) References Cited

U.S. PATENT DOCUMENTS

| | | | | |
|---|---|---|---|---|
| 3,930,774 A | * | 1/1976 | Brand et al. ................. | 425/145 |
| 4,135,873 A | * | 1/1979 | Sone et al. .................. | 425/145 |
| 4,841,208 A | * | 6/1989 | Itoh ........................... | 425/145 |
| 5,736,080 A | * | 4/1998 | Suganuma .................... | 425/145 |

FOREIGN PATENT DOCUMENTS

| JP | 8-323824 | 12/1996 |
|---|---|---|
| JP | 2002-28960 | 1/2002 |
| JP | 2005-35039 | 2/2005 |

* cited by examiner

*Primary Examiner*—Tim Heitbrink
(74) *Attorney, Agent, or Firm*—Staas & Halsey LLP

(57) ABSTRACT

A controller of an injection molding machine which compensates a delay in an injection velocity changeover and a delay at the time of changeover to the pressure-holding process, and is capable of more accurate and stable injection velocity control and changing control from the injection velocity control to pressure control. In the injection process, a motion command is outputted in every sampling period τ according to the command injection velocity. When a screw position overshoots the set velocity changeover positions Psw(2) and Psw(1), a motion command based on a velocity command of the next interval is outputted from the next period. However, there is time lag between the point when the set changeover position is reached and the point when the motion command is changed after detection thereof. There generates a motion deficiency in a motion amount shown by mark A and overshoot shown by B. Motion commands of the next period or the next and subsequent several periods are compensated with errors in the motion amount caused by the time lag used as compensation amounts A' and B'. The generated error motion amount is immediately compensated, which enables accurate velocity changing control. By performing the compensation in the same manner when the injection velocity control is switched to the holding pressure control, it is possible to suppress the peak pressure and the dispersion.

10 Claims, 5 Drawing Sheets

CONTROLLER FOR INJECTION MOLDING MACHINE

BACKGROUND OF THE INVENTION

1. Field of the Invention

The present invention relates to a controller for an injection molding machine, and more specifically to changeover of an injection velocity in an injection process and changeover from an injection-velocity control in the injection process to a resin-pressure control in a pressure-holding process.

2. Description of Related Art

With regard to an injection process in the molding operation of an injection molding machine, the method of controlling the injection process by changing injection velocity (forward velocity of a screw) according to the position of the screw that advances in the axial direction to inject resin into the mold or according to injection pressure (resin pressure) during injection and moreover according to the elapsed time from the start of injection is widely employed. As to changeover from the injection process (injection velocity control) to the pressure-holding process (pressure control), when a set changeover point from the velocity to pressure control (screw position, injection pressure, and the elapsed time from the start of injection) is reached, the injection velocity control is switched to the pressure control, to thereby implement the control of pressure, namely holding pressure control.

In the case of a controller of an injection molding machine using a processor, including an electric injection molding machine that drives a screw by means of a motor, a screw position, injection pressure (resin pressure) or elapsed time from the start of injection is detected in every prescribed sampling period. A determination is then made as to whether the detected screw position, injection pressure or elapsed time has reached the injection velocity changeover point or the changeover point from the injection velocity control to the holding pressure control. If the point has been reached, an injection velocity changeover or changeover from the injection velocity control to the pressure control is made. Therefore, the fact that the screw point, injection pressure, or elapsed time from the start of injection, which is set as a changeover point, has been reached is detected after a delay of sampling period time at the maximum. The determination that the set changeover point has been reached is made always after a delay except when the screw position, injection pressure or elapsed time detected in a certain sampling period coincides with the set changeover point by chance. In result, the injection velocity changeover and the changeover to the holding pressure control are delayed.

As a method of compensating this delay and changing the injection velocity at the set changeover point, the method of predicting whether a command position in the next sampling period exceeds the set injection velocity changeover point, and based on the prediction, controlling a motion command to be outputted next has been well known (see JP 8-323824A).

There is another well known invention in which in order to prevent resin from being applied with surge pressure due to the inertia of a screw drive mechanism or the like when a filling process (injection velocity control) is switched to the pressure-holding process (pressure control), once the injection screw reaches a changeover position from the filling process to the pressure-holding process, a position command to move the screw backward from the command position by a prescribed amount is outputted, to thereby suppress the generation of surge pressure (see JP 2002-28960A and JP 2005-35039A).

According to the method of detecting and controlling the screw position, injection pressure (resin pressure) or elapsed time from the start of injection which is the changeover point in every sampling period, as described above, by the time when the changeover point is detected, the changeover point has already been passed. The injection velocity changeover and the changeover to the holding pressure control are not performed, and the changeover is made after a delay.

SUMMARY OF THE INVENTION

The present invention provides a controller for an injection molding machine capable of compensating a delay in injection velocity changeover in an injection process and a delay in changeover from the injection process to a pressure-holding process, to achieve more accurate and stable injection velocity control and changeover from an injection velocity control to a resin pressure control.

According to one aspect of the present invention, a controller of an injection molding machine has an injection screw axially moved by a servomotor at a variable injection velocity in an injection process. The controller comprises: setting means for setting changeover conditions for changing over the injection velocity for respective sections of the injection process, and values of the injection velocity for the respective sections; means for successively outputting a motion command for the servomotor at every sampling period in accordance with the value of the injection velocity set for each of the respective sections; determining means for determining whether or not one of the changeover conditions is met at every sampling period; changeover means for changing over the injection velocity to the set value when the determining means determines that one of the changeover conditions is met; calculating means for calculating a compensation amount as a displaced motion amount of the injection screw caused by a time lag between a point in time when the changeover condition is actually met and a point in time when the determining means determines that the changeover condition is met at one of the sampling periods; and compensating means for compensating the motion command in at least one subsequent sampling period after the determining means determines that the changeover condition is met based on the calculated compensation amount.

In a case where the motion command compensated by the compensation amount exceeds a limit value, the compensation amount may be divided and distributed to a plurality of motion commands in subsequent sampling periods such that the compensated motion commands do not exceed the limit value.

The setting means may set the changeover conditions by positions of the injection screw, and the determining means may determine that the changeover condition is met by determination that the position of the injection screw has reached one of the set positions.

The setting means may set the changeover conditions by values of a resin pressure, and the determining means may determine that the changeover condition is met by determination that the resin pressure has reached one of the set values.

The setting means may set the changeover conditions by lengths of time elapsed from a start of the injection process, and the determining means may determine that the changeover condition is met by determination that the elapsed time has reached one of the set lengths.

According to another aspect of the present invention, a controller of an injection molding machine has an injection screw axially moved by a servomotor to perform an injection-velocity control in an injection process and a resin-pressure control in a pressure-holding process. The controller comprises: setting means for setting a changeover condition for changing over the injection-velocity control to the resin-pressure control; determining means for determining whether or not the changeover condition is met at every sampling period during the injection-velocity control; changeover means for changing over the injection-velocity control to the resin-pressure control when the determining means determines that the changeover condition is met; calculating means for calculating a compensation amount as a displaced motion amount of the injection screw caused by a time lag between a point in time when the changeover condition is actually met and a point in time when the determining means determines that the changeover condition is met at the one of the sampling periods; and compensating means for compensating a motion command for the servomotor in at least one subsequent sampling period after the determining means determines that the changeover condition is met, based on the calculated compensation amount.

The calculating means may calculate the compensation amount based on the time lag, a motion amount by a motion command in a sampling period immediately before the injection-velocity control is changed over to the resin-pressure control, and a motion amount obtained by the pressure-holding control in a sampling period immediately after the injection-velocity control is changed over to the resin pressure control.

The setting means may set the changeover conditions by a position of the injection screw, and the determining means may determine that the changeover condition is met by determination that the position of the injection screw has reached the set position.

The setting means may set the changeover conditions by a value of a resin pressure, and the determining means may determine that the changeover condition is met by determination that the resin pressure has reached the set value.

The setting means may set the changeover conditions by a length of time elapsed from a start of the injection process, and the determining means may determine that the changeover condition is met by determination that the elapsed time has reached the set length.

A screw motion error (motion deficiency, too much motion) caused by time lag between the point when the changeover conditions of the injection velocity and the changeover conditions from the injection velocity control to the pressure control are actually satisfied and the point when it is detected that the changeover conditions are satisfied is compensated. This enables more accurate and stable changeover. Especially at the time of changeover from the injection velocity control to the pressure control, it is possible to hold down the generated peak pressure and suppress the dispersion of the peak pressure, which makes it possible to carry out stable pressure control.

DETAILED DESCRIPTION

Figure 1A:
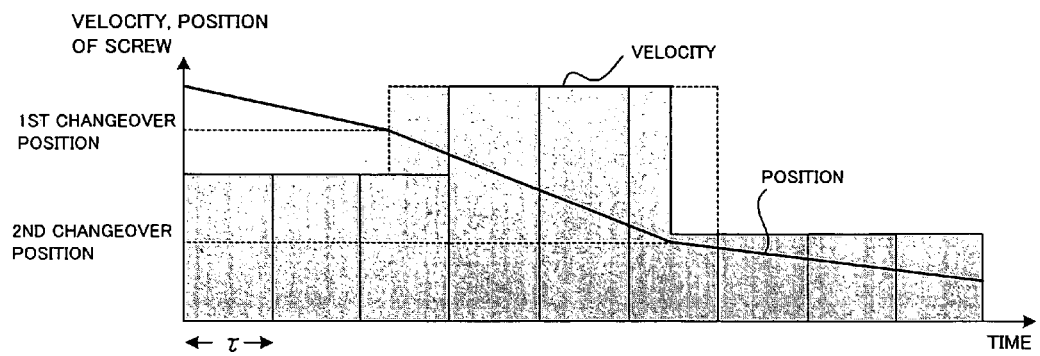
FIGS. 1a and 1b are explanatory views showing a state in which an injection velocity changeover is made in an ideal manner and a state in which it is carried out in a conventional manner.
Figure 1B:
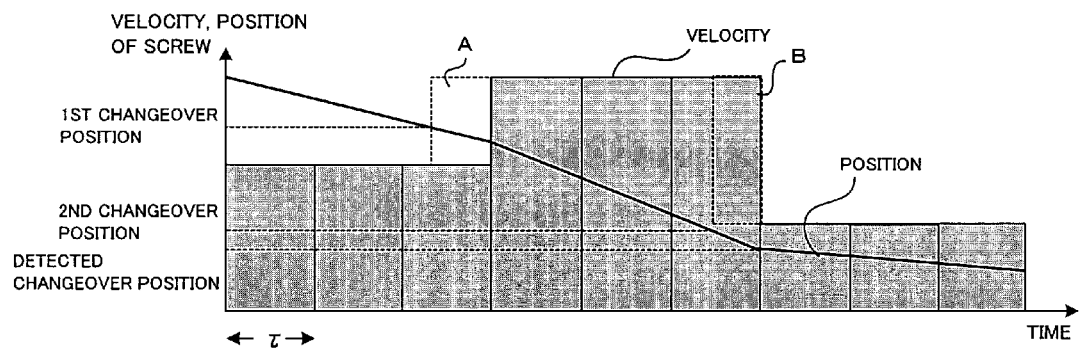

FIGS. 1a and 1b are explanatory views of an injection velocity changeover in an injection process. In FIGS. 1a and 1b, a horizontal axis denotes time, and a vertical axis denotes injection velocity and a screw position. The injection velocity is expressed as a motion amount (motion command) per unit of time, namely (velocity×$\tau$=motion amount), where a motion amount for the duration of a sampling period (position/velocity loop processing period) $\tau$ is area per unit of time $\tau$, and height thereof is velocity. The injection velocity (motion amount in a sampling period) is shown by a bar graph, and the screw position by a line graph.

FIG. 1a shows an ideal state in which a velocity command is switched, and an injection velocity is switched at a set velocity changeover position.

FIG. 1b shows a state of a conventional velocity changeover. In case that a position and velocity of a screw are controlled by means of a processor, based on the motion command, a detection position, and velocity feedback in every position/velocity loop period (prescribed sampling period), the position/velocity loop processing is carried out, to thereby output a command to a servomotor for driving the screw, so that the detection of the screw position is performed in every sampling period. For this reason, a velocity command is switched for the first time in a sampling period after a set changeover position is passed.

Therefore, at a velocity changeover point, when the velocity is increased by the velocity changeover, there generates a motion deficiency of a screw motion amount shown by mark A in FIG. 1b. When velocity is switched to lower velocity, there generates an overshoot amount of the screw, shown by mark B in FIG. 1b. This means that the velocity is not switched at the set velocity changeover point (position), and as a result, the screw position at the velocity changeover point also varies. This displacement continues as long as the switched velocity is maintained.

Figure 2:
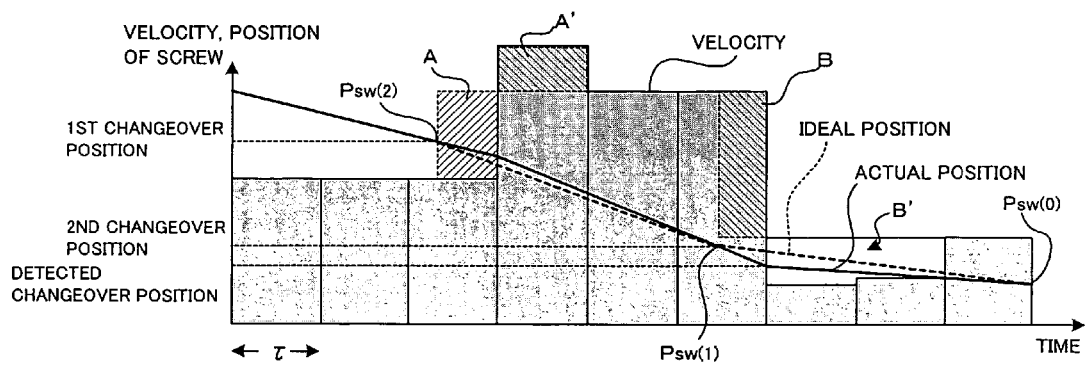
FIG. 2 is an explanatory view showing an injection velocity changeover according to the present invention.

According to the present invention, as shown in FIG. 2, at the time of the velocity changeover for increasing the velocity, a compensation amount of a motion amount A' corresponding to screw motion deficiency A is added to a motion command of the next sampling period or the next and subsequent several sampling periods (position/velocity loop processing periods). At the time of the velocity changeover for reducing the velocity, a motion amount B' corresponding to an overshoot amount B is subtracted as a compensation amount from a motion command of the next sampling period or the next and subsequent several sampling periods (position/velocity loop processing periods), to thereby carry out compensation. Referring to FIG. 2, a horizontal axis denotes time, and $\tau$ represents a timing period as in FIG. 1. A vertical axis denotes velocity or a screw position. The velocity is shown by a bar graph, and the position by a line graph.

Because of the compensation, the motion deficiency and overshoot of the screw at the velocity changeover point are resolved within the next sampling period or the next and subsequent several sampling periods (position/velocity loop processing periods), so that the injection velocity control is performed with more accuracy.

FIGS. 3a, 3b, 4a and 4b are explanatory views for explaining a state at the time of changeover from injection velocity control (filling process) of an injection process to pressure control of a pressure-holding process. As in FIGS. 1a and 1b, a horizontal axis denotes time, and τ represents a timing period. A vertical axis denotes velocity or a screw position. The velocity is shown by a bar graph, and the position by a line graph.

Figure 3A:
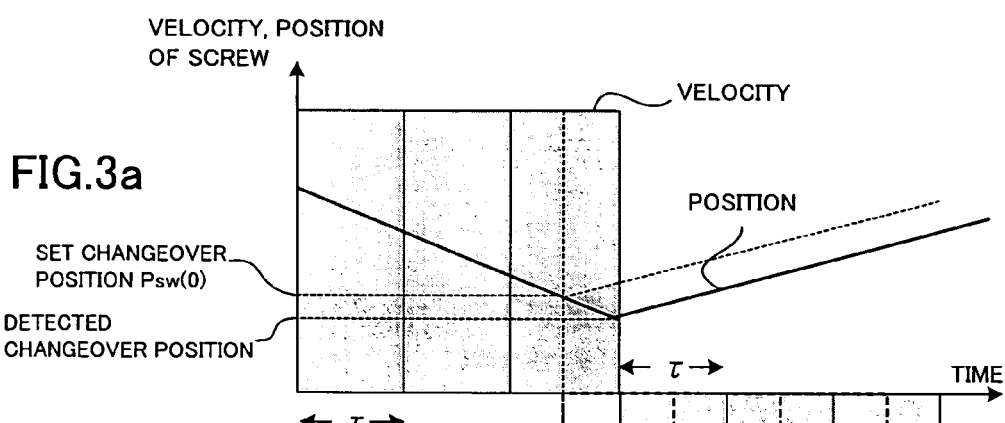
FIGS. 3a and 3b are explanatory views showing an ideal state and a conventional state at the time of changeover from injection velocity control to holding pressure control.
Figure 3B:
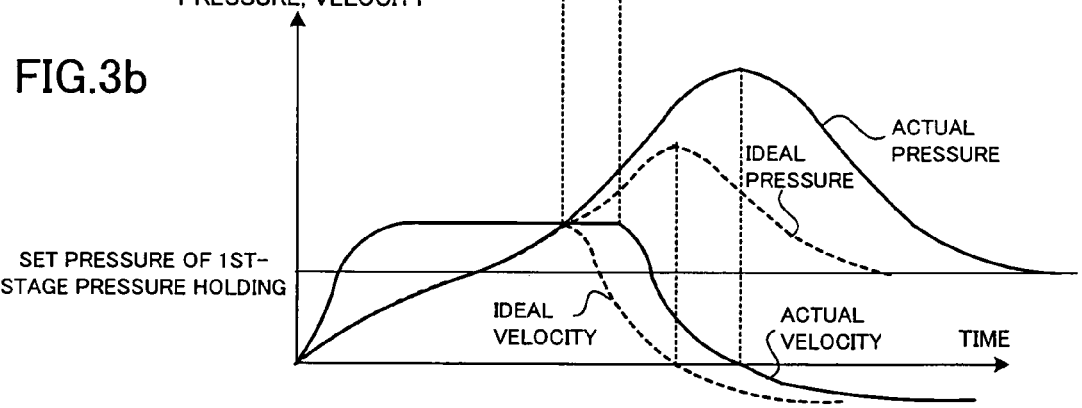

FIGS. 3a and 3b show a state in which changeover to pressure holding is ideally made and a state in which changeover from the injection velocity control of the injection process (filling process) to the pressure control of the pressure-holding process is performed by making an actual changeover that has been conventionally carried out.

Let us say that changeover to pressure holding is ideally performed, and the changeover is made at a set changeover position Psw(0). Generally, the set pressure of first-stage pressure holding is set by the injection velocity control of the injection process (filling process) to be lower than resin pressure at the point when the changeover position Psw(0) to set pressure holding is reached. Therefore, pressure deviation of difference between the set holding pressure (target pressure) in pressure feedback control and actual pressure becomes negative pressure deviation. The screw driven by the pressure deviation is then driven in a direction opposite to a direction in which it is driven during the injection velocity control.

As shown by a broken line in FIG. 3a, the velocity command is outputted as a command of an opposite (negative) direction, and as shown by a solid-line graph of FIG. 3b, the velocity is reduced. Even if the velocity is reduced, however, the screw actually continues to move forward due to a mechanical delay, so that the resin pressure is increased. Only after the screw moves in the opposite direction (the velocity acts in the opposite direction), the resin pressure is reduced and is controlled by pressure control so as to coincide with set target holding pressure. That is to say, a velocity curving line and a resin pressure curving line shown by broken lines in FIG. 3b are obtained.

In actuality, the detection that the screw reaches the changeover position Psw(0) to the set pressure holding is performed at the end the sampling period in which the changeover position Psw(0) is passed, namely at the beginning of the next sampling period, and the changeover to the pressure control is carried out at this point. Therefore, the changeover is made at a position overshooting the set changeover position Psw(0), and as shown by solid lines in FIGS. 3a and 3b, the screw overshoots as much as the changeover is delayed. Even if the deceleration is started from the above position, peak pressure of resin pressure is increased as much as the changeover is delayed compared to the ideal changeover. In addition, depending on that the point where the set changeover position Psw(0) to pressure holding is passed is located at the beginning or end of a sampling period, the overshoot amount from the set changeover position Psw(0) varies. This means that the peak pressure generated after the pressure-holding process begins varies.

Figure 4A:
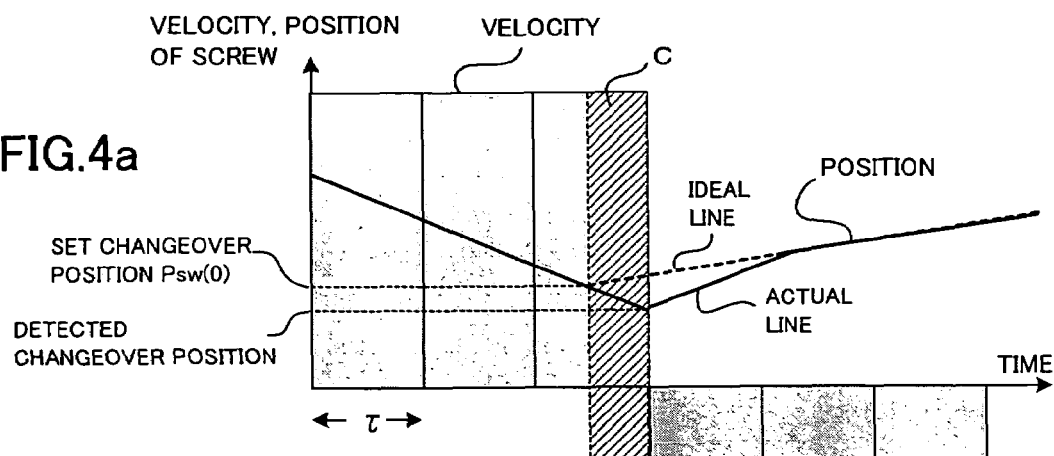
FIGS. 4a and 4b are explanatory views showing a state at the time of changeover from the injection velocity control to the holding pressure control according to the present invention.
Figure 4B:
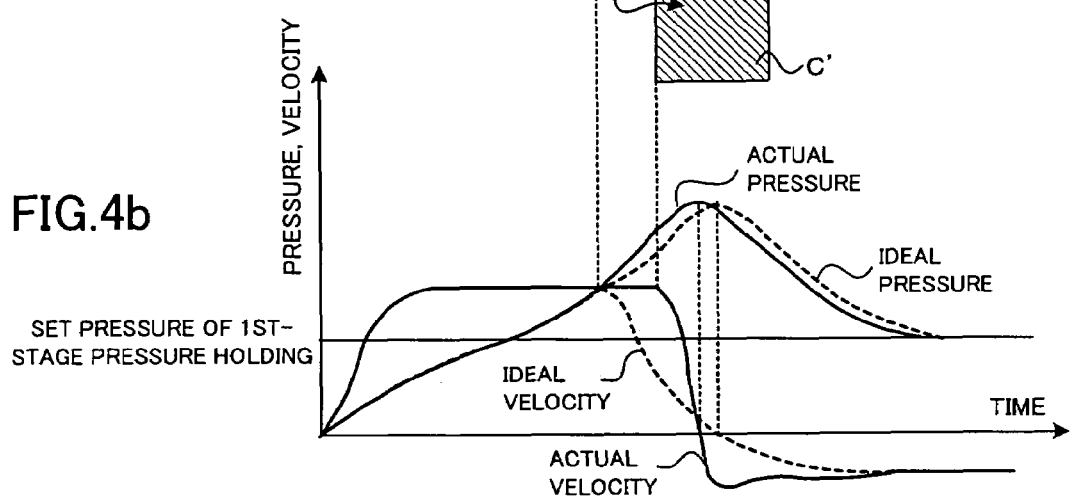

FIGS. 4a and 4b show a state at the time of changeover to the pressure holding when the present invention is applied (solid lines) and a state in which the changeover is ideally made (broken lines). According to the present invention, an overshoot amount C from the set changeover position Psw (0) to the point when the changeover is actually made is subtracted from a motion command issued in and after the next period to be outputted as a compensation amount C'. When the pressure holding is just started, the pressure deviation usually becomes negative as described, and there generates a motion command in the negative (opposite direction) direction. Since the compensation amount C' is subtracted from the above motion command, the motion command in the opposite direction (negative direction) is increased, and the velocity is rapidly lowered. This reduces the overshoot amount generated during deceleration and lowers the peak pressure of the resin pressure, thereby reducing them virtually to the degree that the changeover is ideally made. Additionally, the overshoot amount caused by the lag in timing of the changeover to the pressure control is immediately corrected, so that the variation of the peak pressure is reduced.

Figure 5:
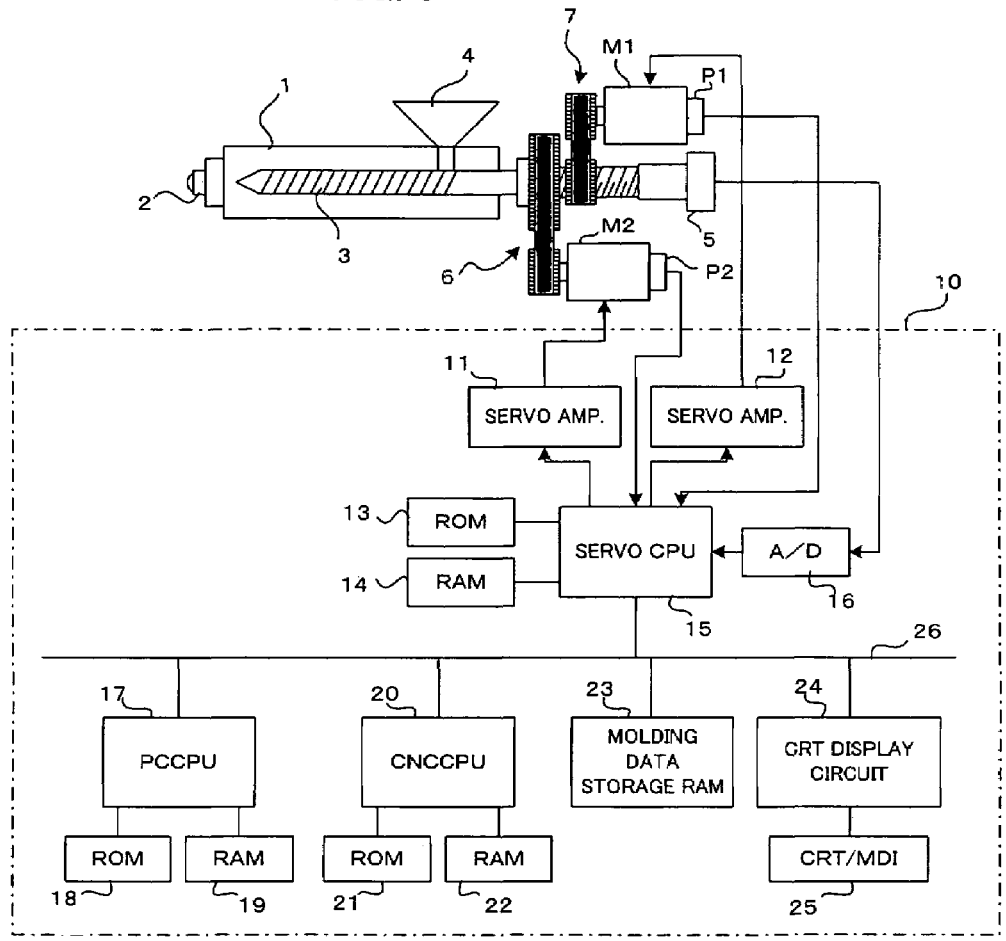
FIG. 5 is a block diagram showing a substantial portion of one embodiment of the present invention.

FIG. 5 is a block diagram of a substantial portion of one embodiment when the present invention is applied to an electric injection molding machine.

A nozzle portion 2 is fixed to a tip end of an injection cylinder 1, and an injection screw 3 is inserted in the injection cylinder 1. Provided to the injection screw 3 is a pressure sensor 5, such as a load cell, which detects resin pressure from pressure applied to the injection screw 3. The injection screw 3 is rotated by a screw rotation servomotor M2 through transmission means 6 formed of a pulley, a belt, etc. The injection screw 3 is driven by an injection servomotor M1 through transmission means 7 including a mechanism that converts rotary motion of the pulley, belt, ball screw/nut mechanism and the like into linear motion, and the injection screw 3 is moved in an axial direction. Mark P1 represents a position/velocity detector that detects an axial position and velocity of the injection screw 3 by detecting the position and velocity of the servomotor M1. Mark P2 denotes a position/velocity detector that detects a rotational position and rotational velocity of the injection screw 3 by detecting the position and velocity of the servomotor M2. Mark 4 is a hopper that supplies resin to the injection cylinder 1.

A controller 10 of an injection molding machine of the present invention has a CNCCPU 20 that is a microprocessor for numerical control, a PCCPU 17 that is a microprocessor for a programmable controller, and a servo CPU 15 that is a microprocessor for servo control. By selecting mutual input and output through a bus 26, information transmission between the microprocessors can be performed.

Connected to the servo CPU 15 are a ROM 13 that stores a control program exclusive for servo control, which implements the processings of pressure loop, position loop, velocity loop and current loop, and a RAM 14 used for temporary storage of data. The servo CPU 15 is connected through an A/D (Analog/Digital) converter 16 so as to detect a pressure signal from the pressure sensor 5 that detects various kinds of pressure, such as injection pressure, which is disposed on a main unit of the injection molding machine side. Further connected to the servo CPU 15 are servo amplifiers 12 and 11 that drive the injection and screw rotation servomotors M1 and M2 connected to an injection shaft and a screw rotary shaft according to a command from the CPU 15. Outputs from the position/velocity detectors P1 and P2 fixed to the servomotors M1 and M2 are feedbacked to the servo CPU 15. Rotational positions of the servomotors M1 and M2 are calculated by the servo CPU 15 on the basis of position feedback signals from the position/velocity detectors P1 and P2 and are updated and stored in respective present position storage registers. Although FIG. 5 shows only the servomotors M1 and M2 that drive the injection shaft and the screw rotary shaft, the position/velocity detectors P1 and P2 that detect the rotational positions and velocity of the servomotors M1 and M2, and the servo amplifiers 12 and 11, shafts including a mold clamping shaft that carries out the mold clamping of a mold, an ejector shaft that removes a molded object from the mold and the like have the same structure as the foregoing, and are omitted in FIG. 5.

A ROM 18 that stores a sequence program for controlling sequence operation of the injection molding machine and the like and a RAM 19 used for temporary storage of operation data and the like are connected to the PCCPU 17. A ROM 21 that stores an automatic operation program for totally controlling the injection molding machine and the like and a RAM 22 used for temporary storage of operation data and the like are connected to the CNCCPU 20.

A molding data storage RAM 23 made up of a nonvolatile memory is a memory for molding data storage, which stores molding conditions, various set values, parameters, macro variables relative to injection molding operation, and the like. A manual data input device with CRT 25 is connected to the bus 26 through a CRT display circuit 24, is capable of carrying out selection of a graph display and a function menu, input operation of various data, and the like, and is provided with a numeric keypad for numerical data input, various function keys, and the like. As a display device, one using liquid crystal may be employed.

According to the above-described structure, the PCCPU 17 controls the sequence operation of the entire injection molding machine, and the CNCCPU 20 performs distribution of motion commands with respect to the servomotors of the respective shafts on the basis of the operation program of the ROM 21, the molding conditions stored in the data storage RAM 23, and the like. The servo CPU 15 carries out servo control, such as position loop control, velocity loop control and current loop control, as usual on the basis of the motion commands distributed to the respective shafts, the position and velocity feedback signals detected by the position/velocity detectors P1 and P2, and the like. Moreover, the pressure signal from the pressure sensor 5 is received through the A/D converter 16 to detect resin pressure, and the pressure loop control is implemented to control the injection servomotor M1.

The above-mentioned structure is the same as a conventional controller of an electric injection molding machine. As to the present invention, a difference is that software of an output processing function of motion commands, including compensation processing performed by the servo CPU 15 in the after-mentioned injection process, is stored in the ROM 13.

Figure 6:
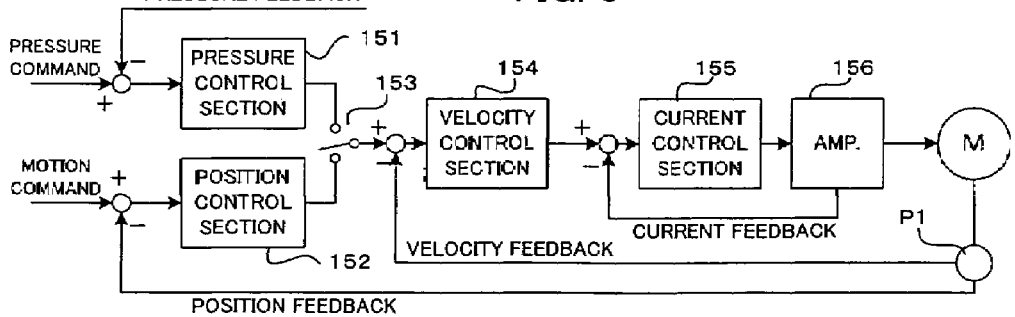
FIG. 6 is a block diagram showing servo control that controls an injection servomotor in the same embodiment.

FIG. 6 is a block diagram of servo control for drive-controlling the injection servomotor M1 and a block diagram showing the processing performed by the servo CPU 15.

In the injection process, a motion command to the injection motor M1 for driving the screw 3 and injecting molten resin into the mold is outputted from the CNCCPU 20 to the servo CPU 15 in every prescribed period on the basis of set velocity. The servo CPU 15 divides the above motion command into motion commands for respective sampling periods (position/velocity loop processing periods) τ. In a position control section 152, a motion amount of position feedback from the position/velocity detector P1 is subtracted from the motion command in every sampling period τ to obtain position deviation. The position deviation is multiplied by a position gain to obtain a velocity command. A switch 153 is connected to the position control section side when the injection process begins. In a velocity control section 154, the velocity command outputted from the position control section 152 and a velocity feedback value from the position/velocity detector P1 are subtracted to obtain velocity deviation. The velocity loop control of proportion, integration and the like is performed to obtain a torque command (current command). In a current control section 155, according to the torque command and the current feedback that is feedbacked from the amplifier 156, the current loop processing is performed, and the injection servomotor M1 is drive-controlled through the amplifier 156.

As described, in the injection process, until the changeover to the pressure holding, according to a motion command with respect to each prescribed period based on the set velocity transmitted from the CNCCPU 20, a motion command with respect to each sampling period (position/velocity loop processing period) τ is obtained, and the position, velocity and current loop processings are performed to drive-control the injection servomotor M1. While the forward velocity of the screw is controlled, the molten resin is injected into the mold.

When the set changeover point to the pressure-holding process is reached, the switch 153 is switched to a pressure control section 151 side. The pressure control section 151 subtracts resin pressure, which is feedbacked after being detected by the pressure sensor 5 and converted into a digital signal by the A/D converter 16, from a pressure command transmitted from the CNCCPU 20 to obtain pressure deviation, and multiplies the pressure deviation (corresponding to position deviation) by a coefficient to obtain and output a velocity command (motion amount within the sampling period τ). As a result, in the pressure-holding process, the velocity command is obtained on the basis of the pressure deviation, and the velocity loop and the current loop processings are performed, to thereby control the velocity of the screw so that command pressure and detection pressure coincide with each other.

In the example shown in FIG. 6, the output of the pressure control section 151 is outputted as a velocity command to the velocity control section 154. In some cases, however, the output of the pressure control section 151 serves as a torque command to be used as a command to the current control section 155. In this case, the switch 153 is disposed after the velocity control section 154, and the output of the velocity control section 154 is selected in an injection velocity control interval of the injection process, whereas the output of the pressure control section 151 is selected to serve as a torque command (current command) in a pressure control interval of the pressure-holding process.

Figure 7:
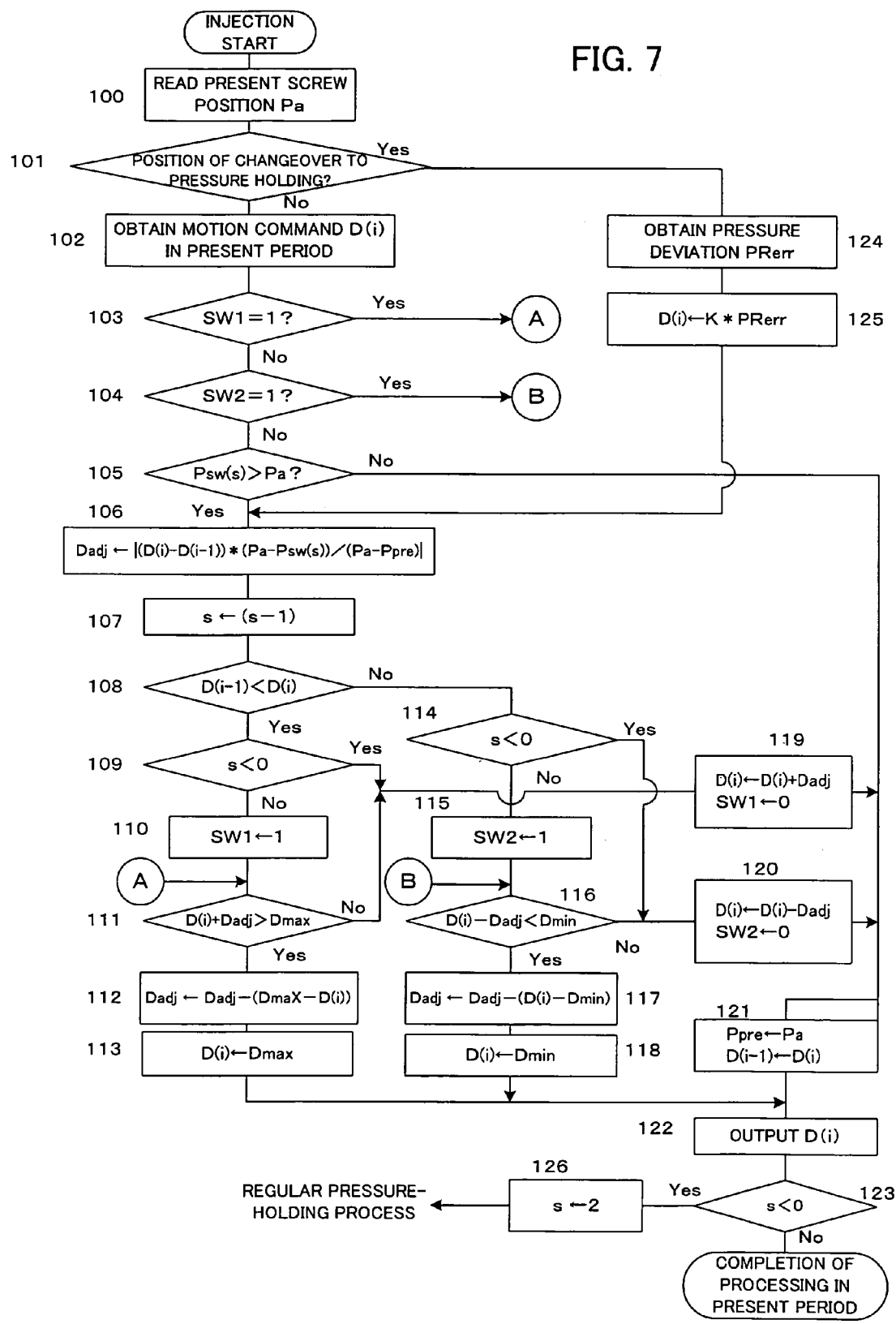
FIG. 7 is a flowchart showing motion command output processing in the same embodiment.

FIG. 7 is a flowchart of motion command output processing that the servo CPU 15 carries out in the injection process in every sampling period (position/velocity loop processing period) τ.

First, let us presuppose that the injection conditions including the number of velocity-changing times s in the injection process, a screw position Psw(s) as a velocity changeover condition, a screw position as a changeover condition to the pressure holding, the number of holding pressure changing stages, the holding pressure of each pressure holding stage, and the like are set. In this embodiment, as shown in FIG. 2, 2 is set (s=2) in a register that stores the number of velocity-changing times s so that the changeover of the injection velocity is made twice, and three-stage injection velocity control is carried out. A first velocity changeover position is set at Psw(2), a second velocity changeover position at Psw(1), and a changeover position to pressure holding at Psw(0). Flags SW1 and SW2 indicating compensation processing of motion commands, which are used in the processing shown in FIG. 7, are set at "0" when the injection molding machine is switched on.

In the injection process, the servo CPU 15 reads the position feedback that is fed back from the position/velocity detector P1 and obtains the present screw position Pa (Step 100), and makes a determination as to whether the set changeover position (Psw(0)) is reached (Step 101). If the changeover position to pressure holding is not reached (it is not reached at first), a motion command D(i) in the present sampling period (position/velocity loop period) τ is obtained (Step 102). Subsequently, a determination is made as to whether the flags SW1 and SW2 are set at "1" (Steps 103 and 104). The flags SW1 and SW2 are not initially set at "1", so that the procedure proceeds to Step 105, and a determination is made as to whether the first velocity changeover position Psw(2) is reached by comparing the velocity changeover position Psw(2) of the first setting with the present screw position Pa obtained in Step 100. An original point of the screw position is a tip end position of the injection cylinder 1. During injection, the screw is driven toward the original position, and the present screw position Pa is greater at the beginning. If the present screw position Pa is equal to or more than the first velocity changeover position Psw(2) and has not overshot the first velocity changeover position Psw(2), the procedure proceeds to Step 121. The present screw position Pa obtained in Step 100 is stored in the register that stores the present screw position Pa as a screw position Ppre of a previous period, and the motion command D(i) of the present period which is obtained in Step 102 is stored in the register as a motion command D(i−1) of the previous period (Step 121). In the next place, the motion command D(i) of the present period is outputted (Step 122), and a determination is made as to whether the number of velocity-changing times s to be stored in the register is smaller than 0 (negative) (Step 123). If it is not smaller than 0, the motion command output processing of the present period is terminated. The servo CPU 15 performs the position loop processing, the velocity loop processing, and the current loop processing on the above motion command D(i), and drives the servomotor M1 to move the screw forward, to thereby perform injection.

Thereafter, as long as the detected screw position Pa does not overshoot the first velocity changeover position Psw(2), the processings of Steps 100 to 105 and Steps 121 to 123 are implemented in every timing period τ.

When the forward movement of the screw 3 progresses, and Step 105 detects that the screw position Pa is smaller than the first velocity changeover position Psw(2) and overshoots the position Psw(2), the procedure proceeds to Step 106, which obtains compensation amounts (corresponding to A' and B') Dadj corresponding to a motion deficiency amount A and an overshoot amount B shown in FIG. 2, which are generated by a delay in the velocity changeover by calculating the following (1) formula:

$$Dadj=|(D(i)-D(i-1))*(Pa-Psw(s))/(Pa-Ppre)| \quad (1)$$

where s=2 at this point in the embodiment.

Subsequently, 1 is subtracted from the number of changing times s to obtain "s−1" (Step 107), and the previous period motion command D(i−1) is compared with the present period motion command D(i) (Step 108). If the present period motion command D(i) is greater, and the velocity is increased at the first velocity changeover as shown in FIG. 2, the procedure proceeds to Step 109, and a determination is made as to whether the number of velocity-changing times s is smaller than 0. The number of velocity-changing times s, however, is s=1 at this point and is not smaller than 0. Therefore, the flag SW1 is set at "1" (Step 110), to thereby store that the compensation processing is in execution. A determination is made as to whether a value obtained by adding the compensation amount Dadj obtained in Step 106 to the present period motion command D(i) exceeds a maximum motion amount (maximum injection velocity) Dmax in one sampling period (Step 111). If the value does not exceed the maximum motion amount (maximum injection velocity) Dmax, the procedure proceeds to Step 119, which makes the value obtained by adding the compensation amount Dadj to the motion command D(i) obtained in Step 102 serve as the present period motion command D(i), and sets the flag SW1 at "0", to thereby execute Steps 121 and 122. Based on this motion command D(i), the position, the velocity and current loop processings are performed to drive-control the servomotor M1. A determination is made as to whether the number of injection velocity-changing times s becomes smaller than "0" (Step 123). If the number of injection velocity-changing times s is not smaller (1at this point), the processings of this sampling period are terminated.

In case that Step 111 determines that the value obtained by adding the compensation amount Dadj to the present period motion command D(i) exceeds the maximum motion amount (maximum injection velocity) Dmax that is a limit value in one sampling period, a value obtained by subtracting the present period motion command D(i) from the maximum motion amount (maximum injection velocity) Dmax is subtracted from the compensation amount Dadj, to thereby obtain a new compensation amount Dadj. The present period motion command D(i) serves as the maximum motion amount (maximum injection velocity) Dmax (Steps 112 and 113). In other words, if the value of (D(i)+Dadj) exceeds the maximum motion amount Dmax, the present motion command D(i) serves as the maximum motion amount (maximum injection velocity) Dmax, and the rest of the subtraction of Dmax outputted as a present motion command from (D(i)+Dadj), namely "Dadj−(Dmax−D(i))", serves as next and subsequent compensation amounts Dadj. The procedure proceeds to Step 122, which outputs the motion command D(i) newly obtained in Step 113, and carries out the position, velocity and current loop processings. A determination is made as to whether the number of injection velocity-changing times s is smaller than "0" (Step 123). Since the number of injection velocity-changing times s is not yet smaller, the processings of this period are directly terminated.

In the next period, the flag SW1 is set at "1". Therefore, after the processings of Steps 100 to 103 are carried out, the procedure proceeds to Step 111. If the value of (D(i)+Dadj) exceeds the maximum motion amount Dmax, the processings of Steps 112 and 113 are implemented. The maximum motion amount Dmax is outputted as the motion command D(i), and the compensation amount Dadj is updated, thereby executing the processings of Steps 122 and 123. The processings of Steps 100 to 103, 111 to 113, 122 and 123 are performed in every period until the value of (D(i)+Dadj)

becomes equal to or less than the maximum motion amount Dmax. When the value of (D(i)+Dadj) becomes equal to or less than the maximum motion amount Dmax, the procedure proceeds from Step 111 to Step 119, to thereby execute the processings of Steps 119, 121, 122 and 123. By so doing, the compensation of the motion deficiency amount A shown in FIG. 2 with respect to the next and subsequent periods is finished. FIG. 2 shows a state in which the compensation is finished in one sampling period.

In Step 119, the flag SW1 is set at "0", so that the processings of Steps 100 to 105 are carried out from the next period. Step 105 compares the second velocity changeover position Psw(1) with the present screw position Pa. If the present screw position Pa does not overshoot the second velocity changeover position Psw(1), the processings of Steps 121 to 123 are implemented. The processings of Steps 100 to 105 and 121 to 123 are performed in every period.

When the screw 3 moves forward, and it is determined that the present screw position Pa overshoots the second velocity changeover position Psw(1) in Step 105, the procedure proceeds to Step 106, which obtains the compensation amount Dadj by calculating the above-mentioned formula (1). Subsequently, 1 is subtracted from the number of injection velocity-changing times s ("0" is obtained at this point in the case of the present embodiment), and the previous period motion command D(i−1) stored in Step 121 is compared with the present period motion command D(i). As illustrated in FIG. 2, in case that the set injection velocity is lowered, if D(i−1)>D(i) is true, the procedure proceeds to Step 114, which makes a determination as to whether the number of injection velocity-changing times s is smaller than 0. Since the number of injection velocity-changing times s is "0" at this point and is not smaller than 0, the procedure proceeds to Step 115, and the flag SW2 is set at "1". In Step 116, a determination is made as to whether the value obtained by subtracting the compensation amount Dadj from the present period motion command D(i) is smaller than a minimum motion amount (minimum injection velocity) Dmin that is a limit value in one sampling period.

If (D(i)−Dadj)≧Dmin is true, the procedure proceeds to Step 120, which sets the flag SW2 at "0", turns (D(i)−Dadj) into the present period motion command D(i), and compensates the compensation amount that is a motion deficiency amount with respect to the motion command of this sampling period. Thereafter, the processings of Steps 121, 122 and 123 are executed.

If Step 116 determines that (D(i)−Dadj)<Dmin is true, and the compensation is impossible in one sampling period, a value obtained by subtracting the minimum motion amount (minimum injection velocity) Dmin from the present period motion command D(i) is subtracted from the compensation amount Dadj, and the result is used as a new compensation amount Dadj. The present period motion command D(i) is used as the minimum motion amount (minimum injection velocity) Dmin (Steps 117 and 118). The processings of Steps 122 and 123 are then implemented. That is to say, in spite that the present period motion command D(i) obtained in Step 102 should be outputted, only the minimum motion amount (minimum injection velocity) Dmin is outputted. As a result, the present period motion command is deficient as much as (D(i)−Dmin). Since the overshoot is already caused by the compensation amount Dadj, "Dadj−(D(i)−Dmin)" obtained by subtracting (D(i)−Dmin) from the compensation amount Dadj is the rest of the overshoot amount and becomes the next and subsequent compensation amounts Dadj.

In the next and subsequent periods, the flag SW2 is set at "1", so that after the processings of Steps 100 to 104 are performed, the procedure proceeds to Step 116, which executes the above-mentioned processings. The processings of Steps 100 to 104, 116 to 118, 122 and 123 are carried out until the value of (D(i)−Dadj) becomes equal to or more than the minimum motion amount Dmin. Once the value of (D(i)−Dadj) becomes equal to or more than the minimum motion amount Dmin, the procedure moves from Step 116 to Step 120, and the processing of Step 120 is implemented. Consequently, the compensation of the overshoot amount (Dadj) is finished, and the flag SW2 is set at "0".

In result, from the next period, the processings of Steps 100 to 105 and 121 to 123 are performed. When it is determined in Step 101 that final-stage injection velocity control is finished, and that the changeover position (Psw (0)) to pressure holding is reached, the procedure proceeds from Step 101 to Step 124. The pressure deviation PRerr that is a difference between a pressure command issued by the CNCCPU 20 and actual resin pressure detected by the pressure sensor 5 and fed back through the A/D converter 16 is obtained. The pressure deviation PRerr is multiplied by a coefficient K and converted into a motion command D(i) as a motion amount per unit of time (Step 125). Subsequently, the procedure proceeds to Step 106, which calculates the (1) formula to obtain the compensation amount Dadj corresponding to the overshoot amount, subtracts "1" from the number of changing times s (−1 in this example) (Step 107), and compares the previous period motion command with the present period motion command (Step 108). In general, when the injection velocity control is switched to the holding pressure control, the resin pressure after the injection velocity control is finished is higher than the set first-stage pressure holding. Accordingly, the pressure deviation becomes negative, and the motion command obtained in Step 125 becomes a negative value (see FIG. 4(a)). Therefore, D(i−1)>D(i) becomes true, and the procedure moves from Step 108 to Step 114. Since the number of changing times s is a value smaller than 0 (−1), the procedure moves from Step 114 to Step 120, which turns a value of (D(i)−Dadj) into the present period motion command D(i). The procedure proceeds to Steps 121 and 122, and the motion command D(i) is outputted, and the position, velocity and current loop processings are performed, to thereby drive-control the servomotor M1. The procedure proceeds from Step 122 to Step 123, which makes a determination as to whether the number of changing times s is smaller than 0. In this case, the number of changing times s is a negative value smaller than 0, so that the procedure proceeds to Step 126. The number of changing times s is set at the number of the set injection velocity-changing times 2. The injection velocity control processing is finished, and the procedure moves to the holding pressure control processing of the pressure-holding process.

As described, when the injection velocity control is switched to the holding pressure control, the overshoot amount from the set changeover position, which is generated by the processing timing of the sampling period, is compensated in the first sampling period after the changeover point is passed. Therefore, the peak pressure after the injection velocity control is switched to the holding pressure control is reduced, and moreover dispersion can be suppressed.

In the above-mentioned embodiment, the changeover of the injection velocity and the changeover from the injection velocity control to the holding pressure control are carried out on the basis of the screw position. However, the changeovers may be made by resin pressure. In case that the changeovers are made by resin pressure, present resin pressure PRSa feedbacked from the pressure sensor 5 is read in Step 100, and the present resin pressure PRSa read in the present period is stored in the register as previous period resin pressure PRSpre in Step 121. When set changeover resin pressure is PRSsw(s), the compensation amount Dadj obtained in Step 106 is obtained by calculating the following (2) formula:

$$Dadj=|D(i)-D(i-1))*(PRSa-PRSsw(s))/(PRSa-PRSpre)| \qquad (2)$$

Additionally, in case that the changeover of the injection velocity and the changeover from the injection velocity control to the holding pressure control are implemented on the basis of the elapsed time from the beginning of injection, the elapsed time is measured from the beginning of injection, and present period elapsed time Ta is obtained in Step 100. When the set changeover time is Tsw(s), the compensation amount Dadj obtained in Step 106 is obtained by calculating the following (3) formula.

$$Dadj=|(D(i)-D(i-1))*(Ta-Tsw(s))/\tau| \qquad (3)$$

What is claimed is:

1. A controller of an injection molding machine having an injection screw axially moved by a servomotor at a variable injection velocity in an injection process, comprising:
    setting means for setting changeover conditions for changing over the injection velocity at respective sections of the injection process, and values of the injection velocity for the respective sections;
    means for successively outputting a motion command for the servomotor at every sampling period in accordance with the value of the injection velocity set for each of the respective sections;
    determining means for determining whether or not one of the changeover conditions is met at every sampling period;
    changeover means for changing over the injection velocity to a set value when said determining means determines that one of the changeover conditions is met;
    calculating means for calculating a compensation amount as a displaced motion amount of the injection screw caused by a time lag between a point in time when the changeover condition is actually met and a point in time when said determining means determines that the changeover condition is met at the sampling; and
    compensating means for compensating the motion command in at least one subsequent sampling period after said determining means determines that the changeover condition is met based on the calculated compensation amount.

2. A controller of an injection molding machine according to claim 1, wherein in a case where the motion command compensated by the compensation amount exceeds a limit value, the compensation amount is divided and distributed to a plurality of motion commands in subsequent sampling periods such that the compensated motion commands do not exceed the limit value.

3. A controller for an injection molding machine according to claim 1, wherein said setting means sets the changeover conditions by positions of the injection screw, and said determining means determines that the changeover condition is met by determination that the position of the injection screw has reached one of the set positions.

4. A controller of an injection molding machine according to claim 1, wherein said setting means sets the changeover conditions by values of a resin pressure, and said determining means determines that the changeover condition is met by determination that the resin pressure has reached one of the set values.

5. A controller of an injection molding machine according to claim 1, wherein said setting means sets the changeover conditions by lengths of time elapsed from a start of the injection process, and said determining means determines that the changeover condition is met by determination that the elapsed time has reached one of the set lengths.

6. A controller of an injection molding machine having an injection screw axially moved by a servomotor to perform an injection-velocity control in an injection process and a resin-pressure control in a pressure-holding process, comprising:
    setting means for setting a changeover condition for changing over the injection-velocity control to the resin-pressure control;
    determining means for determining whether or not the changeover condition is met at every sampling period during the injection-velocity control;
    changeover means for changing over the injection-velocity control to the resin-pressure control when said determining means determines that the changeover condition is met;
    calculating means for calculating a compensation amount as a displaced motion amount of the injection screw caused by a time lag between a point in time when the changeover condition is actually met and a point in time when said determining means determines that the changeover condition is met at the sampling; and
    compensating means for compensating a motion command for the servomotor in at least one subsequent sampling period after said determining means determines that the changeover condition is met, based on the calculated compensation amount.

7. A controller of an injection molding machine according to claim 6, wherein said calculating means calculates the compensation amount based on the time lag, a motion amount by a motion command in a sampling period immediately before the injection-velocity control is changed over to the resin-pressure control, and a motion amount obtained by the pressure-holding control in a sampling period immediately after the injection-velocity control is changed over to the resin-pressure control.

8. A controller for an injection molding machine according to claim 6, wherein said setting means sets the changeover conditions by a position of the injection screw, and said determining means determines that the changeover condition is met by determination that the position of the injection screw has reached the set position.

9. A controller of an injection molding machine according to claim 6, wherein said setting means sets the changeover conditions by a value of a resin pressure, and said determining means determines that the changeover condition is met by determination that the resin pressure has reached the set value.

10. A controller of an injection molding machine according to claim 6, wherein said setting means sets the changeover conditions by a length of time elapsed from a start of the injection process, and said determining means determines that the changeover condition is met by determination that the elapsed time has reached the set length.

* * * * *

UNITED STATES PATENT AND TRADEMARK OFFICE
CERTIFICATE OF CORRECTION

PATENT NO.       : 7,344,369 B2
APPLICATION NO.  : 11/385895
DATED            : March 18, 2008
INVENTOR(S)      : Tatsuhiro Uchiyama et al.

It is certified that error appears in the above-identified patent and that said Letters Patent is hereby corrected as shown below:

Column 3, Line 31, change "resin pressure" to --resin-pressure--.

Column 10, Line 30, change "1at" to --1 at--.

Column 13, Line 10, change "=|$D(i)$" to --=|$(D(i)$--

Signed and Sealed this

Fifth Day of August, 2008

JON W. DUDAS
*Director of the United States Patent and Trademark Office*